(12) United States Patent
Eshleman et al.

(10) Patent No.: US 10,177,691 B2
(45) Date of Patent: Jan. 8, 2019

(54) ELECTRONIC BRAKING OF BRUSHLESS DC MOTOR IN A POWER TOOL

(71) Applicant: Black & Decker Inc., New Britain, CT (US)

(72) Inventors: Scott J. Eshleman, Parkville, MD (US); Tal Gottesman, Lutherville, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/637,056

(22) Filed: Jun. 29, 2017

(65) Prior Publication Data

US 2018/0013360 A1   Jan. 11, 2018

Related U.S. Application Data

(60) Provisional application No. 62/358,732, filed on Jul. 6, 2016.

(51) Int. Cl.
*H02P 5/48* (2016.01)
*H02P 3/12* (2006.01)
(Continued)

(52) U.S. Cl.
CPC .................. *H02P 3/12* (2013.01); *B25F 5/00* (2013.01); *B27B 5/38* (2013.01); *H02K 7/145* (2013.01);
(Continued)

(58) Field of Classification Search
CPC .......... H02P 3/22; H02P 3/12; H02P 29/0241; H02P 27/06; H02P 6/24
See application file for complete search history.

(56) References Cited

U.S. PATENT DOCUMENTS 6,369,538 B1   4/2002   Youn et al.
6,577,483 B1   6/2003   Steicher et al.
(Continued)

FOREIGN PATENT DOCUMENTS

DE   102008033866   1/2010
EP   1278299 A2   1/2003
(Continued)

OTHER PUBLICATIONS

Rakesh, M.: "Different Braking Techniques Employed to a Brushless DC Motor Drive used in Locomotives", Intentional Electrical Engineering Journal, vol. 3 pp. 784-790 Oct. 23, 2012.
(Continued)

*Primary Examiner* — Karen Masih
(74) *Attorney, Agent, or Firm* — Amir Rohani (57) ABSTRACT

A power tool is provided including a brushless direct-current (BLDC) electric motor having a stator and a rotor. The power tool includes power switches including high-side switches and low-side switches disposed on a direct-current (DC) bus line between a power supply and the electric motor, and a controller configured to electronically brake the motor by simultaneously closing the high-side switches or the low-side switches to electrically short the stator windings. In an embodiment, the controller is configured to monitor a voltage of the DC bus line, and if the voltage of the DC bus line is lower than a voltage threshold, execute electronic braking by toggling between closing the high-side switches and closing the low-side switches over braking cycles, and if the voltage of the DC bus line is greater than the voltage threshold, execute braking by closing only the high-side switches or the low-side switches over the braking cycles.

22 Claims, 7 Drawing Sheets

(51) Int. Cl.

| | | |
|---|---|---|
| *B25F 5/00* | (2006.01) | |
| *B27B 5/38* | (2006.01) | |
| *H02P 27/08* | (2006.01) | |
| *H02P 3/22* | (2006.01) | |
| *H02P 29/024* | (2016.01) | |
| *H02K 11/26* | (2016.01) | |
| *H02K 11/33* | (2016.01) | |
| *H02K 7/14* | (2006.01) | |
| *H02P 25/22* | (2006.01) | |
| *H02P 3/14* | (2006.01) | |
| *H02P 3/08* | (2006.01) | |

(52) U.S. Cl.
CPC ............ *H02K 11/26* (2016.01); *H02K 11/33* (2016.01); *H02P 3/22* (2013.01); *H02P 25/22* (2013.01); *H02P 27/08* (2013.01); *H02P 29/0241* (2016.02); *H02P 3/08* (2013.01); *H02P 3/14* (2013.01)

(56) References Cited

U.S. PATENT DOCUMENTS

| | | | |
|---|---|---|---|
| 6,741,050 | B2 | 5/2004 | Wissmach et al. |
| 6,917,169 | B2 | 7/2005 | Nagasawa et al. |
| 7,239,099 | B2 | 7/2007 | Weinmann |
| 7,554,276 | B2 | 6/2009 | Galli et al. |
| 7,567,044 | B2 | 7/2009 | Matsuhashi |
| 7,781,997 | B2 | 8/2010 | Kallioniemi et al. |
| 8,093,844 | B2 | 1/2012 | Milesi et al. |
| 8,237,396 | B2 | 8/2012 | Ikei |
| 8,421,385 | B2 | 4/2013 | Bohm et al. |
| 8,587,231 | B2 | 11/2013 | Pant |
| 8,847,525 | B2 | 9/2014 | Taniguchi et al. |
| 9,054,607 | B2 | 6/2015 | Otaguro |
| 9,054,618 | B2 | 6/2015 | Frank et al. |
| 9,306,478 | B2 | 4/2016 | Kischka et al. |
| 2009/0309527 | A1 | 12/2009 | Anuradha et al. |
| 2012/0019177 | A1 | 1/2012 | Kaufmann et al. |
| 2012/0256573 | A1 | 10/2012 | Ikei |
| 2014/0211344 | A1* | 7/2014 | Pence ............ H02H 7/06 361/20 |
| 2015/0137717 | A1 | 5/2015 | Ishikawa et al. |
| 2015/0280624 | A1 | 10/2015 | Sotome |
| 2015/0326151 | A1 | 11/2015 | Ogawa |

FOREIGN PATENT DOCUMENTS

| | | |
|---|---|---|
| EP | 0910840 | 11/2008 |
| EP | 1278299 A3 | 7/2009 |
| EP | 1655829 | 12/2010 |
| EP | 2433757 | 3/2012 |
| EP | 2854283 A2 | 4/2015 |
| EP | 2854283 A3 | 1/2016 |

OTHER PUBLICATIONS

Extended EPSR dated Nov. 13, 2017 issued in corresponding EP application No. 17179964.6.

* cited by examiner

ELECTRONIC BRAKING OF BRUSHLESS DC MOTOR IN A POWER TOOL

RELATED APPLICATION

This application claims the benefit of US Provisional Application No. 62/358,732 filed Jul. 6, 2016, which is incorporated herein by reference in its entirety.

FIELD

This disclosure relates to power tools, and in particularly to various methods for controlling electronic braking of a brushless DC motor in a power tool.

BACKGROUND

Cordless power tools provide many advantages to traditional corded power tools. In particular, cordless tools provide unmatched convenience and portability. An operator can use a cordless power tool anywhere and anytime, regardless of the availability of a power supply. In addition, cordless power tools provide increased safety and reliability because there is no cumbersome cord to maneuver around while working on the job, and no risk of accidently cutting a cord in a hazardous work area.

However, conventional cordless power tools still have their disadvantages. Typically, cordless power tools provide far less power as compared to their corded counterparts. Today, operators desire power tools that provide the same benefits of convenience and portability, while also providing similar performance as corded power tools.

Brushless DC (BLDC) motors have been used in recent years in various cordless power tools. BLDC motors offer many size and power output advantages over universal and permanent magnet DC motors. BLDC motors are electronically-controller via a programmable controller, and thus do not suffer from many mechanical failures associated with universal motor.

Since BLDC motors are electronically commutated, the controller can also brake the motor electronically. Braking the motor brings it to a quick stop, rather than allow it to coast down. Conventional motor brakes involved complex mechanical components, which are no longer needed when braking the motor electronically. Electronic braking provides many advantages over conventional brakes. However, the way the motor voltage affects the rest of the power tool circuit should be accounted for when executing electronic braking. What is needed is a system and mechanism that allows for effective execution of electronic braking without jeopardizing the performance of the rest of the power tool.

SUMMARY

According to an embodiment of the invention, a power tool is provided including a housing and a brushless direct-current (BLDC) electric motor disposed inside the housing. In an embodiment, the motor includes a stator and a rotor, the stator having stator windings. In an embodiment, the power tool further includes power switches including high-side switches and low-side switches disposed on a direct-current (DC) bus line between a power supply and the electric motor, and a controller configured to control a switching operation of the power switches to operate the electric motor and electronically brake the motor by simultaneously closing the high-side switches or the low-side switches to electrically short the stator windings. In an embodiment, the controller is configured to monitor a voltage of the DC bus line, and if the voltage of the DC bus line is lower than a voltage threshold, execute electronic braking by toggling between closing the high-side switches and closing the low-side switches over braking cycles; and if the voltage of the DC bus line is greater than the voltage threshold, execute braking by closing only the high-side switches or the low-side switches over the braking cycles.

In an embodiment, where the voltage is lower than the voltage threshold, the controller is configured to simultaneously close the high-side switches while opening the low-side switches within a first braking cycle, and simultaneously close the low-side switches while opening the high-side switches within a subsequent second braking cycle.

In an embodiment, the controller is configured to introduce a delay period between the first braking cycle and the second braking cycle, where during the delay period all the high-side switches and the low-side switches are opened.

In an embodiment, the controller is configured to compare the voltage of the DC bus line to the threshold voltage after every braking cycle.

In an embodiment, if the voltage of the DC bus line is greater than the voltage threshold, the controller is configured to execute braking within subsequent braking cycles by closing the low-side switches while keeping the high-side switches open.

In an embodiment, the high-side switches and the low-side switches include Field Effect Transistors (FETs) or Insulated-Gate Metal Transistors (IGBTs).

In an embodiment, the high-side switches includes three high-side switches, and the low-side switches includes three low-side switches.

In an embodiment, the controller is configured to perform braking by closing at least two of the three high-side switches or at least two of the three low-side switches simultaneously.

In an embodiment, if the voltage of the DC bus line is lower than a voltage threshold, the controller executes electronic braking on the low-side switches for a longer period than on the high-side switches.

According to an embodiment of the invention, a power tool is provided including a housing and a brushless direct-current (BLDC) electric motor disposed inside the housing, the motor including a stator and a rotor, the stator having stator windings. In an embodiment, the power tool further includes power switches including high-side switches and low-side switches disposed on a direct-current (DC) bus line between a power supply and the electric motor; and a controller configured to control a switching operation of the power switches to operate the electric motor. In an embodiment, the controller is configured to execute electronic braking on the electric motor in a normal mode in which, over a number of braking cycles, the controller closes the low-side switches while keeping the high-side switches open within one braking cycle, and closes the high-side switches while keeping the low-side switches open within a subsequent braking cycle. In an embodiment, the controller is configured to monitor a voltage on the DC bus line and, if the voltage on the DC bus line is greater than a voltage threshold, switch from the normal mode to an over-voltage mode, in which, over subsequent braking cycles, the controller closes only the high-side switches or the low-side switches.

In an embodiment, the controller is configured to close the low-side switches while keeping the high-side switches open in the over-voltage mode.

In an embodiment, once in the over-voltage mode, the controller continues to execute braking in the over-voltage mode for a remainder of braking execution period.

In an embodiment, when in the over-voltage mode, the controller is configured to continue to monitor the voltage on the DC bus line, and if the voltage on the DC bus line is less than a second voltage threshold, switch from the over-voltage mode to the normal mode. In an embodiment, the second voltage threshold is smaller than the voltage threshold.

In an embodiment, in the normal mode, the controller is configured to introduce a delay period between the braking cycles, where during the delay period all the high-side switches and the low-side switches are opened.

In an embodiment, controller is configured to compare the voltage of the DC bus line to the threshold voltage after every braking cycle.

In an embodiment, the high-side switches and the low-side switches comprise Field Effect Transistors (FETs) or Insulated-Gate Metal Transistors (IGBTs).

In an embodiment, the high-side switches includes three high-side switches, and the low-side switches includes three low-side switches. In an embodiment, the controller is configured to perform braking by closing at least two of the three high-side switches or at least two of the three low-side switches simultaneously.

In an embodiment, in the normal mode, the controller executes electronic braking on the low-side switches for a longer period than on the high-side switches.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The drawings described herein are for illustration purposes only and are not intended to limit the scope of this disclosure in any way.

Corresponding reference numerals indicate corresponding parts throughout the several views of the drawings.

DETAILED DESCRIPTION

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Reference is initially made to application Ser. No. 14/715,258 filed May 18, 2015, which is incorporated herein by reference in its entirety, for detailed description of a power tool system including high-power (i.e. 60V or above) DC-only or AC/DC power tools having brushless DC (BLDC) motors. Reference is also made to application Ser. No. 14/057,003 filed Oct. 13, 2013 (published as US. Pub. No. 2015/0111480), for detailed description of an exemplary AC powered power tool having a BLDC motor. This disclosure describes a motor and power module assembly that may be utilized in various high-power AC-only, DC-only, or AC/DC power tools having BLDC motors. Examples of such tools include, but are not limited to, hammer drills, concrete nailers, miter saws, grinders, etc.

Figure 1:
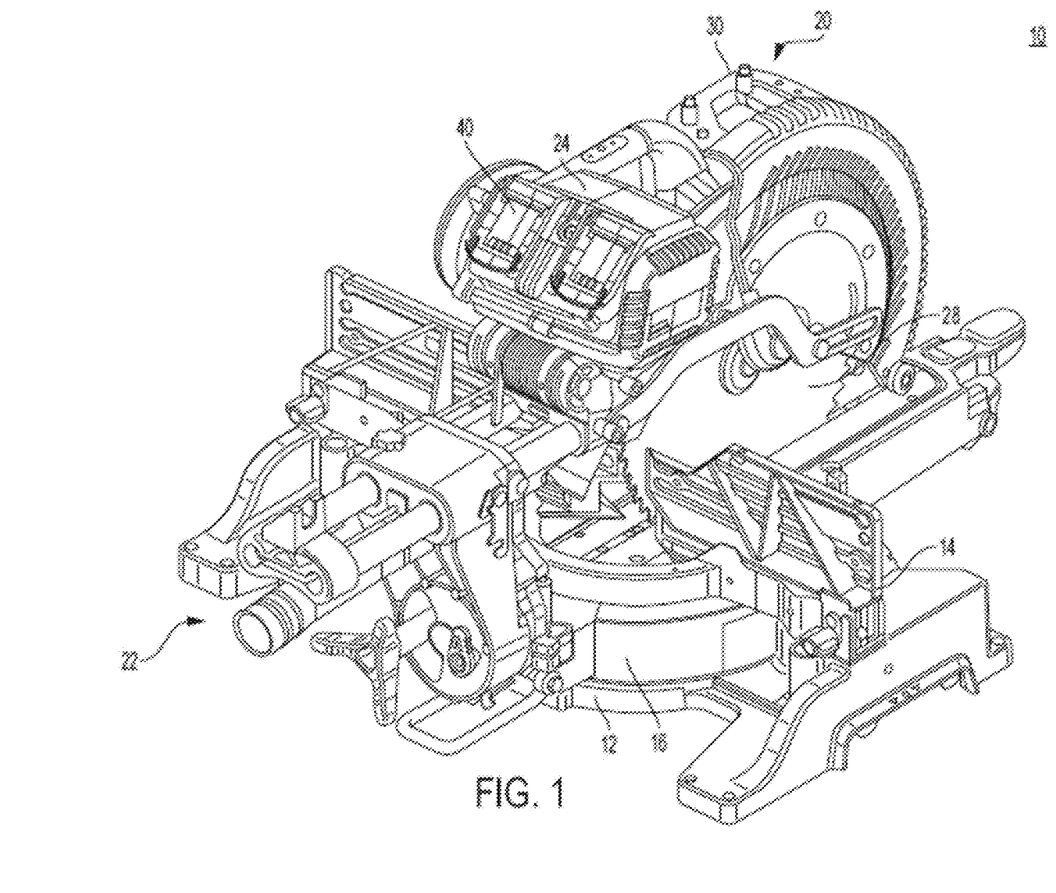
FIG. 1 depicts an exemplary perspective view of a high-power power tool, according to an embodiment.

FIG. 1 depicts an exemplary high-power power tool, in this case a miter saw 10, according to an embodiment. In an embodiment, miter saw 10 has a generally circular base 12 with an attached fence 14, which base supports a rotatable table 16 that is rotatably adjustable for setting the miter angle of the work piece placed on the table 16. A saw blade and motor assembly, indicated generally at 20, is operatively connected to the table 16 by a linear guide mechanism, indicated generally at 22. The saw blade and motor assembly 20 includes a tool housing 24 housing an electric motor that is operatively connected through a belt and gear mechanism, not shown but located within housing portion 26 that drives a saw blade 28. A handle 30 enables an operator to move the blade and motor assembly 20 into and out of engagement with a work piece that may be placed on the table 16 adjacent the fence 14.

The miter saw as illustrated in FIG. 1 is illustrative and the teachings of this disclosure may apply to any miter saw, or any other high-power power tool. For more details about an exemplary miter saw, reference is made to U.S. Pat. No. 8,631,734, which is incorporated herein by reference in its entirety.

In an embodiment, the power tool 10 of the present disclosure may include one or more battery receptacles 40. Battery receptacles 40 may receive two battery packs (e.g., two 60V max battery packs, or two 20/60V max battery packs configured in their 60V max configuration) and connect the two battery packs in series for a total of 120 VDC. Alternatively, the battery receptacle may be adapted to receive an adaptor pack that is coupled to an AC power source and provides AC power, through the battery receptacle 40 terminals, to the power tool 10. Details of a high-power DC, or a high-power AC/DC power tool system, including the battery pack and adaptor configurations, is described in PCT Application Publication No. WO 2015/179318, which is incorporated herein by reference in its entirety.

Figure 2:
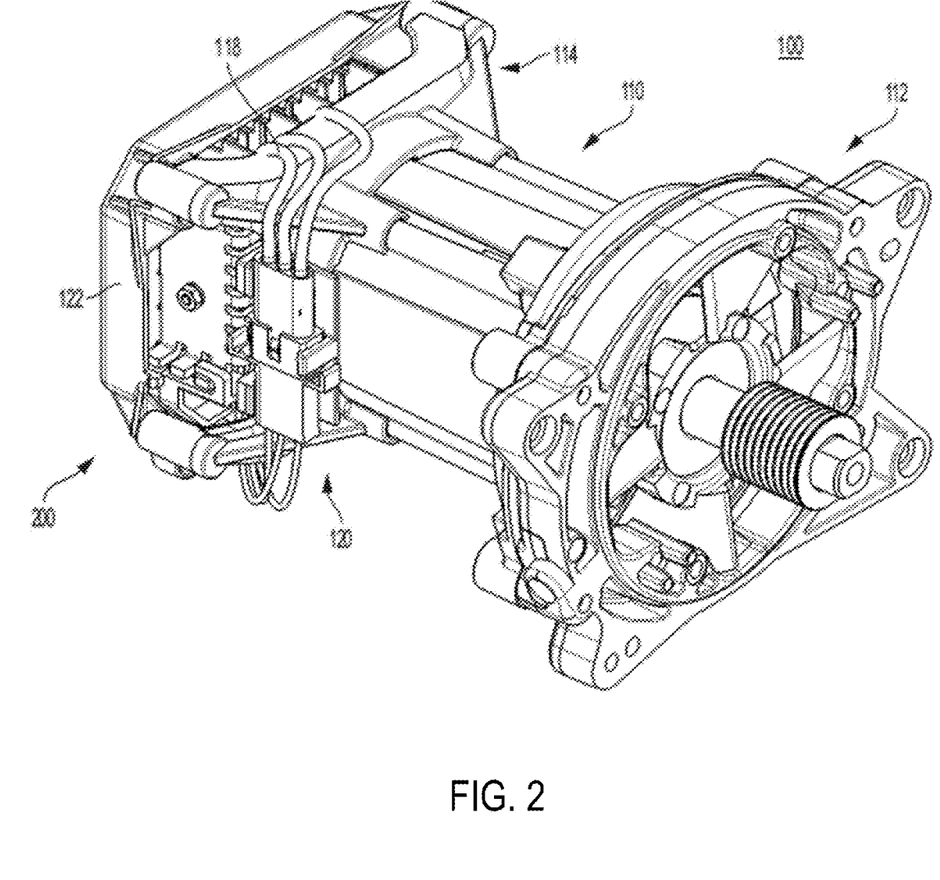
FIG. 2 depicts a perspective view of a motor assembly including a brushless DC motor and the motor control and power module mounted thereto, according to an embodiment.

FIG. 2 depicts an exemplary motor assembly 100 including a brushless DC motor 110, a mount 112 attached to one end of the motor 110 for securing the motor assembly 100 inside the motor housing 24 of the power tool 10, a mounting bracket 114 secured on the second end of the motor 110, and a control and power module 200 secured to the mounting bracket 114, as described later in detail. The control and power module 200 includes the electronic components for controlling the motor 110 commutation and is connected to the motor 110 terminals via a series of wires 118 and a connector 120. A cover 122 is secured to the end of the mounting bracket 114 to house the control and power module 200. The motor assembly 100 is described in great detail in U.S. patent application Ser. No. 15/335,568 filed Oct. 27, 2016, contents of which are incorporated herein by reference in entirety.

Figure 3:
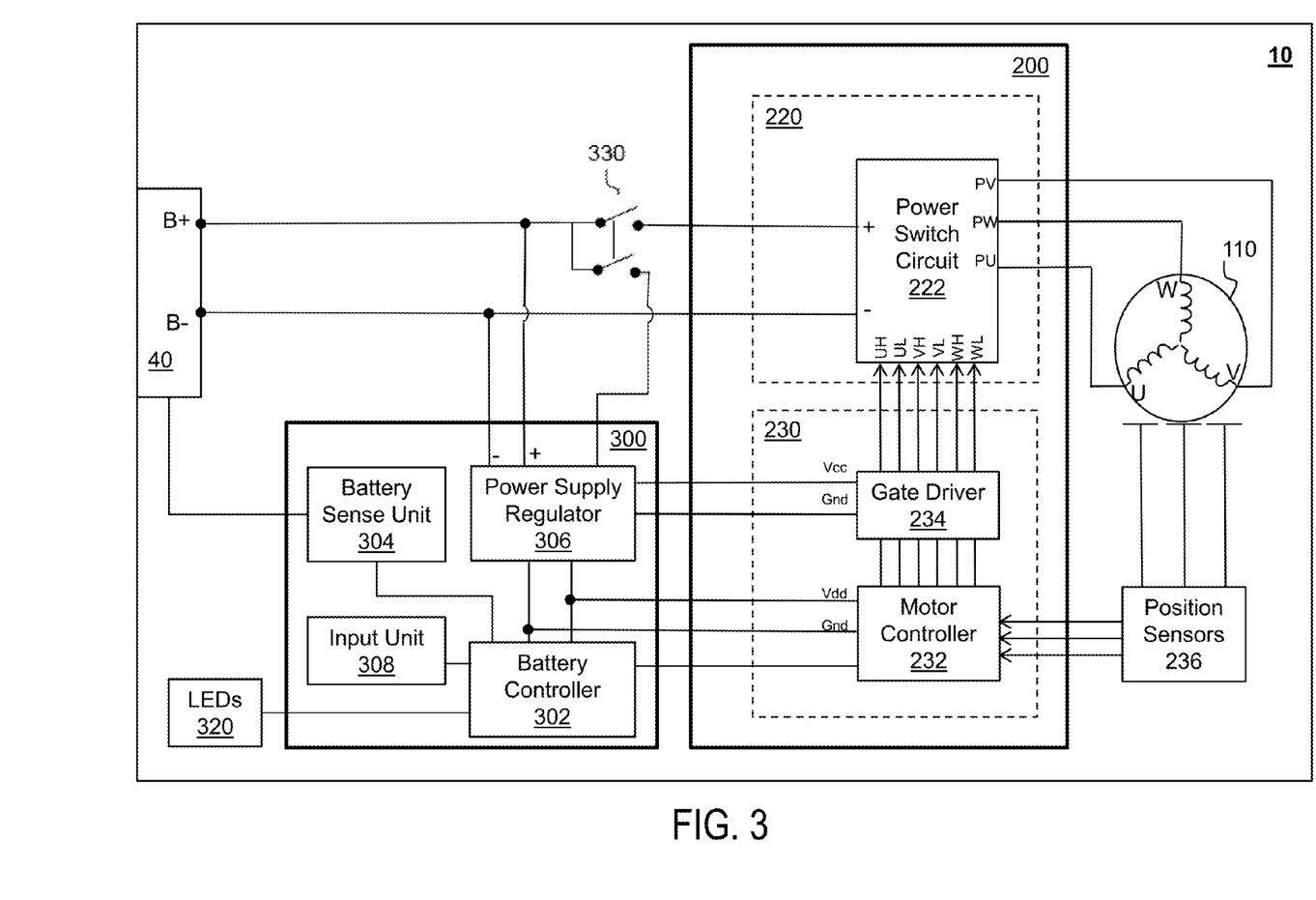
FIG. 3 depicts a block diagram for the battery management control module and the motor control and power module for the power tool, according to an embodiment.

FIG. 3 depicts an exemplary block circuit diagram of the power tool 10 components, according to an embodiment. In an embodiment, power tool 10 includes a motor control and power module 200 disposed between battery receptacle 40 and motor 110. In an embodiment, power tool 10 further includes a battery management control module 300. These features are described here in detail.

In an embodiment, motor control and power module 200 includes a power unit 220 and a control unit 230.

In an embodiment, power unit 220 may include a power switch circuit 222 coupled between the power source B+/B− terminals and motor windings to drive BLDC motor 110. In an embodiment, power switch circuit 222 may be a three-phase bridge driver circuit including six controllable semiconductor power switches, e.g. Field Effect Transistors (FETs), Insulated-Gate Metal Transistors (IGBTs), etc.

In an embodiment, FETs may be more suitable for relatively lower power/lower voltage power tool applications (e.g., power tools having operating voltages of approximately 10 to 80 V), and IGBTs may be more suitable for relatively higher voltage/higher voltage power tool applications (e.g., power tools having operating voltages of approximately 100-240 V).

In an embodiment, control unit 230 may include a controller 232 and a gate driver 234. In an embodiment, controller 232 is a programmable device (e.g., a microcontroller, micro-processor, etc.) arranged to control a switching operation of the power devices in power switching circuit 222. In an embodiment, controller 232 handles all aspect of motor control, including, but not limited to, motor drive and commutation control (including controlling the switching operation of the power switching circuit 222 to control motor speed, forward/reverse drive, phase current limit, start-up control, electronic braking, etc.), motor stall detection (e.g., when motor suddenly decelerates or motor current rapidly rises), motor over-voltage detection and shutdown control, motor or module over-temperature detection and shutdown control, electronic clutching, and other control operations related to the motor.

In an embodiment, controller 232 receives rotor rotational position signals from a set of position sensors 236 provided in close proximity to the motor 100 rotor. In an embodiment, position sensors 236 may be Hall sensors. It should be noted, however, that other types of positional sensors may be alternatively utilized. It should also be noted that controller 232 may be configured to calculate or detect rotational positional information relating to the motor 100 rotor without any positional sensors (in what is known in the art as sensorless brushless motor control). Controller 232 may also receive a variable-speed signal from variable-speed actuator or a speed-dial if the power tool is a variable-speed tool. Based on the rotor rotational position signals from the position sensors 238 and the variable-speed signal, controller 232 outputs drive signals UH, VH, WH, UL, VL, and WL through the gate driver 234. Gate driver 234 is provided to output the voltage level needed to drive the gates of the semiconductor switches within the power switch circuit 222 in order to control a PWM switching operation of the power switch circuit 222.

In an embodiment, battery management control module 300 includes a battery controller 302 that is separate and distinct from the motor controller 232, a battery sense unit 304, a power supply regulator 306, and an input unit 308.

The power supply regulator 306 may include one or more voltage regulators to step down the power supply to a voltage level compatible for operating the two controllers 232 and 302 and/or the gate driver 234. In an embodiment, power supply regulator 306 may include a buck converter and/or a linear regulator to reduce the power voltage from the battery receptacle 40 down to, for example, 15V for powering the gate driver 234, and down to, for example, 3.3V for powering the controllers 302 and 232.

In an embodiment, battery controller 302, similarly to motor controller 232, is programmable device (e.g., a microcontroller, micro-processor, etc.) arranged to control various management aspects of the battery and the power tool. In an embodiment, controller 302 detects when the tool is turned on or off power switch 330 and initiates and/or cuts off supply of power to motor control and power module 200 accordingly. In an embodiment, battery controller accomplishes this by cutting off the supply of power to the motor controller 232 and/or gate driver 234 from the power supply regulator 306. The battery controller 302 may additionally or alternatively receive forward/reverse or trigger on/off signals from an input unit 308 coupled to a trigger switch. The battery controller also receives sense signals of the battery packs via battery sense unit 304, determines if the battery is experiencing a fault condition (e.g., under-voltage, over-current, over-temperature, etc.), and shuts off the supply of power accordingly. In an embodiment, the two controllers 232 and 302 communicate via a serial communication protocol, e.g., Universal Asynchronous Receiver/Transmitter (UART).

It is noted that while the circuit diagram of FIG. 3 is designed for a power tool that receives DC power, the principle teachings of this disclosure may similarly be applied to an AC/DC power tool capable of receiving AC or DC power, where the AC power is passed through a rectifier circuit. Examples of such a system are described in PCT Application Publication No. WO 2015/179318 filed May 18, 2015, which is incorporated herein by reference in its entirety.

Figure 4:
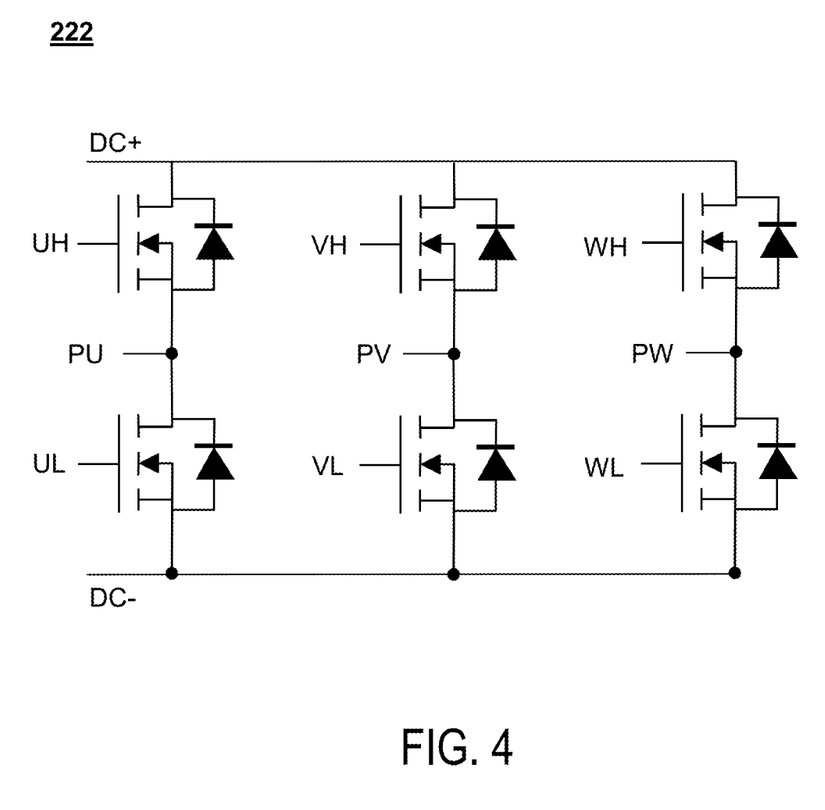
FIG. 4 depicts a circuit block diagram of an inverter circuit of the motor control and power module, according to an embodiment.

FIG. 4 depicts an exemplary power switch circuit 222 having a three-phase inverter bridge circuit, according to an embodiment. As shown herein, the three-phase inverter bridge circuit includes three high-side switches and three low-side switches. The gates of the high-side switches driven via drive signals UH, VH, and WH, and the gates of the low-side switches are driven via drive signals UL, VL, and WL. In an embodiment, the drains of the high-side switches are coupled to the sources of the low-side switches to output power signals PU, PV, and PW for driving the BLDC motor 100.

Figure 5:
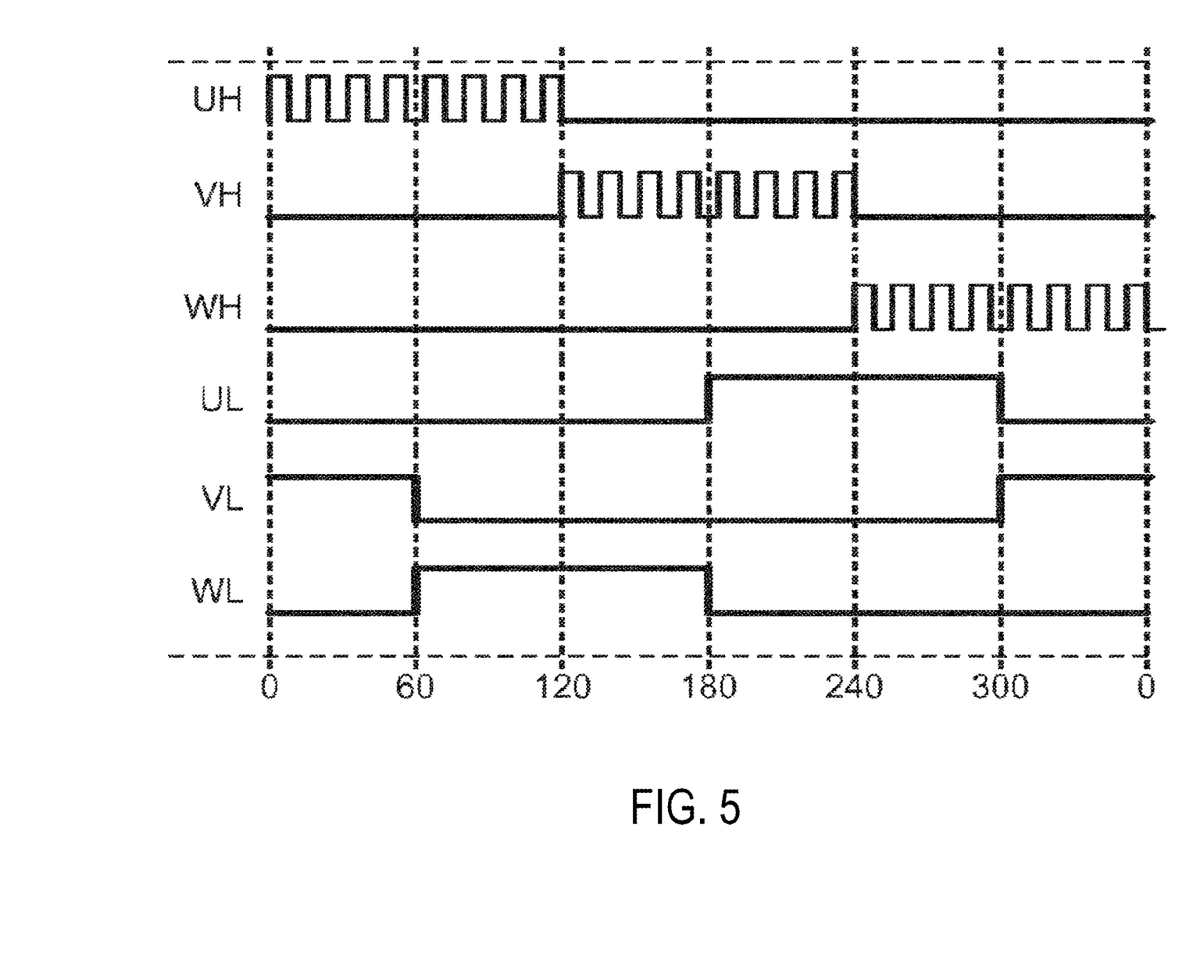
FIG. 5 depicts a waveform diagram of a pulse-width modulation (PWM) drive sequence of the three-phase inventor bridge circuit of FIG. 4 within a full 360 degree conduction cycle, according to an embodiment.

FIG. 5 depicts an exemplary waveform diagram of a pulse-width modulation (PWM) drive sequence of the three-phase inventor bridge circuit of FIG. 4 within a full 360 degree conduction cycle. As shown in this figure, within a full 360° cycle, each of the drive signals associated with the high-side and low-side power switches is activated during a 120° conduction band ("CB"). In this manner, each associated phase of the BLDC motor is energized within a 120°

CB by a pulse-width modulated voltage waveform that is controlled by the control unit 230 as a function of the desired motor rotational speed. For each phase, the high-side switch is pulse-width modulated by the control unit 230 within a 120° CB. During the CB of the high-side switch, the corresponding low-side switch is kept low, but one of the other low-side switches is kept high to provide a current path between the power supply and the motor windings. The control unit 230 controls the amount of voltage provided to the motor, and thus the speed of the motor, via PWM control of the high-side switches.

It is noted that while the waveform diagram of FIG. 4 depicts one exemplary PWM technique at 120° CB, other PWM methods may also be utilized. One such example is PWM control with synchronous rectification, in which the high-side and low-side switch drive signals (e.g., UH and UL) of each phase are PWM-controlled with synchronous rectification within the same 120° CB.

There are various events that may prompt the controller 232 to stop motor commutation. Examples of such events include, but are not limited to, trigger-release by the user, a battery over-current condition (i.e., when the controller senses or receives a signal indicative of the current being drawn from the battery exceeds a predetermined threshold), a battery under-voltage condition (i.e., when the controller 302 senses or receives a signal indicative of the battery voltage or the voltage on a battery cell or series of cells falls below a predetermined threshold), a battery over-temperature condition (i.e., when the controller 302 senses or receives a signal indicative of the battery temperature being outside a predetermined temperature range), motor 100 or power module 222 over-temperature condition (i.e., when the controller 232 determines that the temperature of a thermistor embedded within the power module 222 or the motor 110 is outside a predetermined temperature range), etc. Upon detection of such an event, the controller 232 may stop commutation of the motor 100 and allow the motor 100 to coast down by deactivating all the high-side and low-side power switches of power switch circuit 222. In this scenario, current resulting from the back-EMF (electro-magnetic force) voltage of the motor 100 is conducted backwards through the anti-parallel diodes of the power switches and the motor 100 slowly slows down as a result of the internal friction between the motor components until it comes to a stop. It is noted that since BLDC motors do not benefit from the friction between brushes and the commutator present in conventional brushed motors during coasting, the coasting period may take longer than desired.

Alternatively, according to an embodiment, the controller 232 may electronically brake the motor 100 by short-circuiting the high-side or low-side power switches of the power switch circuit 222. In an embodiment, controller 232 may turn ON the three high-side power switches simultaneously while the three low-side power switches are turned off. Alternatively, controller 232 may turn ON the three low-side power switches simultaneously while the three high-side power switches are turned off. Either of these techniques allows the back-EMF current of the motor 100 to circulate through the motor windings, thus stopping the rotation of the motor. Specifically, as the rotor continues to spin inside the stator, the change in magnetic flux in the stator coils resulting from the rotation of the rotor lamination stack results in a back-EMF voltage developing on the stator coils. Short-circuiting the coils completes the circuit, allowing the back-EMF induced current to flow through the windings and dissipate, thus generating a braking force to stop the rotation of the rotor.

Figure 6:
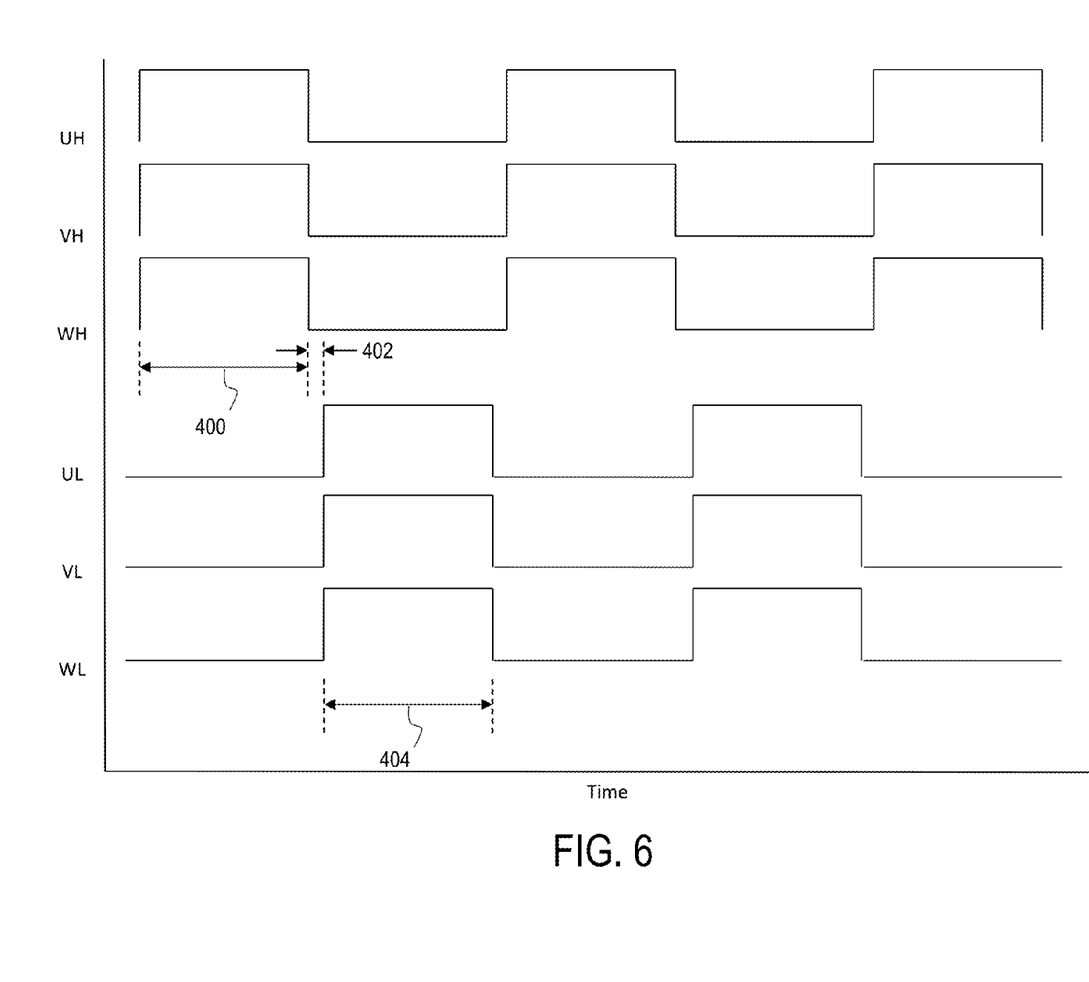
FIG. 6 depicts a waveform diagram of an exemplary braking scheme, according to an embodiment.

FIG. 6 depicts a waveform diagram of an exemplary braking scheme, according to an embodiment. In this embodiment, the controller 232 may alternatingly turn the high-side and low-side power switches ON (i.e., simultaneously turning the high-side switches ON for a given period, followed by simultaneously turning the low-side switches ON for a given period) in order to distribute the braking current between the low-side and high-side switches. Specifically, the controller 232 turns on the three high-side switches while keeping the low-side switches off during a high-side braking cycle 400, then turns off the high-side switches and simultaneously turns on the three low-side switches during a subsequent low-side braking cycle 404, and so on. This arrangement allows the controller to share the thermal load between the high-side and low-side switches. In an embodiment, a bootstrap circuit is provided to turn ON the high-side switches. In an embodiment, a small delay period (i.e., dead time) 402 is introduced between the high-side and low-side braking cycles 400 and 404 during which time all switches are off. This ensures there is no shoot-through of one high-side switch and one low-side switch of the same leg at any given time, which would be catastrophic for the power switches. A more detailed description of an exemplary braking method, reference is made to U.S. Pat. No. 9,246,421, which is incorporated herein by reference in its entirety.

It is noted that while in this example all three high-side or low-side switches are turned on simultaneously during a braking cycle, it is possible to brake the motor by turning on only two of the high-side or two of the low-side switches simultaneous. While this technique is not as efficient and takes a longer time to execute braking, it may be suitable in some systems, and is within the scope of this disclosure.

It is also noted that while in this example the toggling between the high-side and low-side switches takes place every braking cycle, the braking execution over the high-side or the low-side switches may be performed for several cycles. In other words, while in this example the ON-time of the high-side and low-side braking is the same, the on-time for the high-side and low-side braking may be different. For example, there may be a single cycle of high-side braking followed by 2-5 cycles of low-side braking.

It was found that under certain circumstances, during the delay period (i.e., dead time), the back-EMF of the motor 110 causes the voltage on the DC bus line to build up. This is particularly the case when power switch 330 is open, preventing the back-EMF current from flowing into the battery. If the bus voltage build-up becomes too large, it can damage the power switching 222 components.

Accordingly, in an embodiment of the invention, the controller (i.e., battery controller 302, or motor controller 232) is configured to monitor the voltage on the DC bus line and stop the braking method of FIG. 6 if the voltage becomes too high. In this scenario, the controller may execute braking by turning on only the high-side or the low-side power switches until the motor comes to a complete stop.

Figure 7:
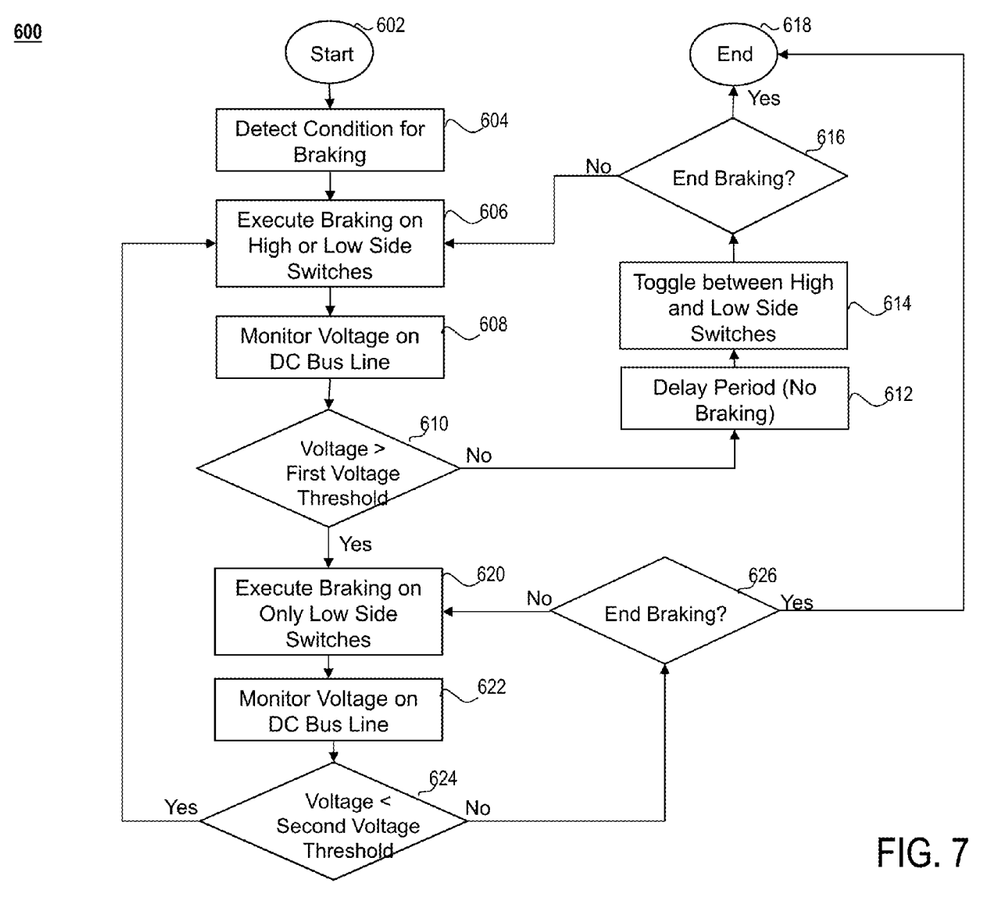
FIG. 7 depicts an exemplary process flow 600 executed by the controller for electronically braking the motor, according to an embodiment.

FIG. 7 depicts an exemplary process flow 600 executed by the controller 302 for electronically braking the motor 110, according to an embodiment. In this embodiment, the controller 302 starts at 602 and continues to detect a condition for braking the motor 110 at 602. As discussed above, this condition may be release of the trigger switch by the user, turning off the tool (i.e., power switch 330) by the user, or a fault condition such as a rotor stall, battery failure, battery over-temperature, etc. Then, at 604, the controller executed braking on the three high-side power switches or the three low-side power switches for a single braking cycle, as shown in FIG. 6. The controller 302 then monitors the voltage across the DC bus line (i.e., the voltage line coupled to the + and − terminals of the power switch circuit 222 in FIG. 3) at 608. The controller 302 may monitor the voltage across the DC bus line continuously or at the end of the braking cycle. The controller 302 determines whether the monitored voltage on the DC bus line is greater than a predetermined first voltage threshold (e.g., 170V for a 120V power tool system) at 610. If it is determined that the DC bus voltage is below the threshold, the controller 302 continues to execute braking by toggling between the high-side and low-side switches, as shown in FIG. 6. Specifically, in step 612, the controller turns off all the high-side and low-side witches within a delay period (dead time), and then turns on the other of the high-side or low-side switches at step 614 to continue the next braking cycle as shown in FIG. 6. If the controller 302 determines at 616 that it should stop executing the braking algorithm (e.g., if the rotor has come to a halt), it ends the process at 818. Otherwise, it continues these steps beginning at 606.

In an embodiment, if the controller 302 determines at step 610 that the DC bus voltage has exceeded the first voltage threshold, it stops toggling between the high-side and low-side switches, and executes braking on only the high-side or low-side switches 620 for the remainder of the braking execution period.

It is noted that execution of braking on the high-side switches requires an adequate bootstrap circuit. Accordingly, execution of braking on the low-side switches may be preferable in an embodiment.

In an additional embodiment, the controller 302 may continue to monitor the voltage on the DC bus line at 622 and revert back to its normal routine if the voltage drops below a second voltage threshold at 624. In an embodiment, the second voltage threshold may be lower than the first voltage threshold in step 610 to provide proper hysteresis thresholding. Alternatively, the first and second voltage thresholds may be the same value. If the voltage is below the second voltage threshold, the process returns to stop 606 for execution of the normal braking algorithm using the high-side and low-side switches. Otherwise, the process continues at 626, where the controller 302 decides whether to terminate the braking execution. If yes, the process ends at 618. Otherwise, the process continues at 620.

Some of the techniques described herein may be implemented by one or more computer programs executed by one or more processors residing, for example on a power tool. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:
a housing;
a brushless direct-current (BLDC) electric motor disposed inside the housing, the motor including a stator and a rotor, the stator having a plurality of stator windings;
a plurality of power switches including a plurality of high-side switches and a plurality of low-side switches disposed on a direct-current (DC) bus line between a power supply and the electric motor; and
a controller configured to control a switching operation of the plurality of power switches to operate the electric motor and electronically brake the motor by simultaneously closing the plurality of high-side switches or the plurality of low-side switches to electrically short the plurality of stator windings, wherein the controller is configured to monitor a voltage of the DC bus line, and if the voltage of the DC bus line is lower than a voltage threshold, execute electronic braking by toggling between simultaneously closing the plurality of high-side switches and simultaneously closing the plurality of low-side switches over a plurality of braking cycles to electrically short the plurality of stator windings; and if the voltage of the DC bus line is greater than the voltage threshold, execute electronic braking by simultaneously closing only the plurality of high-side switches or the plurality of low-side switches over the plurality of braking cycles to electrically short the plurality of stator windings.

2. The power tool of claim 1, wherein, where the voltage is lower than the voltage threshold, the controller is configured to simultaneously close the plurality of high-side switches while opening the plurality of low-side switches within a first braking cycle, and simultaneously close the plurality of low-side switches while opening the plurality of high-side switches within a subsequent second braking cycle.

3. The power tool of claim 2, wherein the controller is configured to introduce a delay period between the first braking cycle and the second braking cycle, where during the delay period all the plurality of high-side switches and the plurality of low-side switches are opened.

4. The power tool of claim 1, wherein the controller is configured to compare the voltage of the DC bus line to the threshold voltage after every braking cycle.

5. The power tool of claim 4, wherein if the voltage of the DC bus line is greater than the voltage threshold, the controller is configured to execute braking within a subsequent plurality of braking cycles by closing the plurality of low-side switches while keeping the plurality of high-side switches open.

6. The power tool of claim 1, wherein the plurality of high-side switches and the plurality of low-side switches comprise Field Effect Transistors (FETs) or Insulated-Gate Metal Transistors (IGBTs).

7. The power tool of claim 1, wherein the plurality of high-side switches includes three high-side switches, and the plurality of low-side switches includes three low-side switches.

8. The power tool of claim 7, wherein the controller is configured to perform braking by closing at least two of the three high-side switches or at least two of the three low-side switches simultaneously.

9. The power tool of claim 1, wherein if the voltage of the DC bus line is lower than a voltage threshold, the controller executes electronic braking on the plurality of low-side switches for a longer period than on the plurality of high-side switches.

10. The power tool of claim 2, wherein a delay period is provided between the first braking cycle and the second braking cycle, where during the delay period all the plurality of high-side switches and the plurality of low-side switches are opened.

11. A power tool comprising:
a housing;
a brushless direct-current (BLDC) electric motor disposed inside the housing, the motor including a stator and a rotor, the stator having a plurality of stator windings;
a plurality of power switches including a plurality of high-side switches and a plurality of low-side switches disposed on a direct-current (DC) bus line between a power supply and the electric motor; and
a controller configured to control a switching operation of the plurality of power switches to operate the electric motor and execute electronic braking on the electric motor in a normal mode in which, over a plurality of braking cycles, the controller simultaneously closes the plurality of low-side switches while keeping the plurality of high-side switches open within one braking cycle to electrically short the plurality of stator windings, and simultaneously closes the plurality of high-side switches while keeping the plurality of low-side switches open within a subsequent braking cycle to electrically short the plurality of stator windings,
wherein the controller is configured to monitor a voltage on the DC bus line and, if the voltage on the DC bus line is greater than a voltage threshold, switch from the normal mode to an over-voltage mode, in which, over a subsequent plurality of braking cycles, the controller simultaneously closes only the plurality of high-side switches or the plurality of low-side switches to electrically short the plurality of stator windings.

12. The power tool of claim 11, wherein the controller is configured to close the plurality of low-side switches while keeping the plurality of high-side switches open in the over-voltage mode.

13. The power tool of claim 11, wherein, once in the over-voltage mode, the controller continues to execute braking in the over-voltage mode for a remainder of braking execution period.

14. The power tool of claim 11, wherein, when in the over-voltage mode, the controller is configured to continue to monitor the voltage on the DC bus line, and if the voltage on the DC bus line is less than a second voltage threshold, switch from the over-voltage mode to the normal mode.

15. The power tool of claim 14, wherein the second voltage threshold is smaller than the voltage threshold.

16. The power tool of claim 11, wherein in the normal mode, the controller is configured to introduce a delay period between the braking cycles, where during the delay period all the plurality of high-side switches and the plurality of low-side switches are opened.

17. The power tool of claim 11, wherein the controller is configured to compare the voltage of the DC bus line to the threshold voltage after every braking cycle.

18. The power tool of claim 11, wherein the plurality of high-side switches and the plurality of low-side switches comprise Field Effect Transistors (FETs) or Insulated-Gate Metal Transistors (IGBTs).

19. The power tool of claim 11, wherein the plurality of high-side switches includes three high-side switches, and the plurality of low-side switches includes three low-side switches.

20. The power tool of claim 19, wherein the controller is configured to perform braking by closing at least two of the three high-side switches or at least two of the three low-side switches simultaneously.

21. The power tool of claim 11, wherein in the normal mode, the controller executes electronic braking on the plurality of low-side switches for a longer period than on the plurality of high-side switches.

22. The power tool of claim 11, wherein in the normal mode, a delay period is provided between the braking cycles, where during the delay period all the plurality of high-side switches and the plurality of low-side switches are opened.

\* \* \* \* \*